(12) United States Patent
Yang et al.

(10) Patent No.: US 11,455,417 B2
(45) Date of Patent: Sep. 27, 2022

(54) DATA PROCESSING METHODS, APPARATUSES, AND DEVICES

(71) Applicant: ALIPAY (HANGZHOU) INFORMATION TECHNOLOGY CO., LTD., Zhejiang (CN)

(72) Inventors: Renhui Yang, Hangzhou (CN); Shubo Li, Hangzhou (CN); Yuan Chen, Hangzhou (CN); Wenyu Yang, Hangzhou (CN); Qin Liu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/348,975

(22) Filed: Jun. 16, 2021

(65) Prior Publication Data

US 2021/0312073 A1    Oct. 7, 2021

(30) Foreign Application Priority Data

Sep. 4, 2020    (CN) .......................... 202010922306.8

(51) Int. Cl.
*G06F 21/62* (2013.01)
*G06F 21/60* (2013.01)
(Continued)

(52) U.S. Cl.
CPC ........ *G06F 21/6227* (2013.01); *G06F 21/602* (2013.01); *G06F 21/64* (2013.01);
(Continued)

(58) Field of Classification Search
CPC ......... G06F 21/602; G06F 21/62–6272; G06F 21/64; G06F 21/70; G06F 21/71;
(Continued)

(56) References Cited

U.S. PATENT DOCUMENTS 8,752,203 B2 * 6/2014 Reinertsen .............. G06F 21/34
726/28
10,505,741 B1 12/2019 Conley
(Continued)

FOREIGN PATENT DOCUMENTS

| CN | 1996955 | 7/2007 |
|---|---|---|
| CN | 103677935 | 3/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Kevin Bechtel
(74) *Attorney, Agent, or Firm* — Fish & Richardson P.C.

(57) ABSTRACT

Embodiments of the present specification disclose data processing methods, apparatuses, and devices. One method comprises: obtaining an acquisition request for target data of a data owner; determining a trusted application (TAPP) for generating the target data based on decentralized identifier document (DID Doc) information of the data owner in response to the acquisition request; sending, to the TAPP, a target data generation request to use the TAPP to process data of the data owner obtained from a trusted institution; and receiving a processing result from the TAPP in response to the target data generation request.

20 Claims, 4 Drawing Sheets

(51) Int. Cl.
  *G06F 21/64* (2013.01)
  *G06F 21/78* (2013.01)
(52) U.S. Cl.
  CPC ...... *G06F 21/78* (2013.01); *G06F 2221/2129* (2013.01); *G06F 2221/2141* (2013.01)
(58) Field of Classification Search
  CPC ..... G06F 21/78–805; G06F 2221/2129; G06F 2221/2141; H04L 63/10–102; H04L 67/02
  See application file for complete search history.

(56) References Cited

U.S. PATENT DOCUMENTS

| | | | | |
|---|---|---|---|---|
| 2014/0181198 | A1* | 6/2014 | Motes | H04L 67/104 709/204 |
| 2014/0304836 | A1* | 10/2014 | Velamoor | H04L 63/08 726/28 |
| 2018/0232394 | A1* | 8/2018 | Danziger | G06F 16/172 |
| 2018/0254898 | A1* | 9/2018 | Sprague | H04L 9/3271 |

FOREIGN PATENT DOCUMENTS

| | | |
|---|---|---|
| CN | 104010044 | 8/2014 |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 110555292 | 12/2019 |
| CN | 110636062 | 12/2019 |
| CN | 110837658 | 2/2020 |
| CN | 110968743 | 4/2020 |
| CN | 110990804 | 4/2020 |
| CN | 111049660 | 4/2020 |
| CN | 111179067 | 5/2020 |
| CN | 111191268 | 5/2020 |
| CN | 111222157 | 6/2020 |
| CN | 111340627 | 6/2020 |
| CN | 111414599 | 7/2020 |
| CN | 111415157 | 7/2020 |
| CN | 111506662 | 8/2020 |
| CN | 111597565 | 8/2020 |
| CN | 111741036 | 10/2020 |
| WO | WO 2019179535 | 5/2020 |

OTHER PUBLICATIONS

Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/362,914, filed Jun. 29, 2021, Qin Liu.
U.S. Appl. No. 17/359,475, filed Jun. 25, 2021, Renhui Yang.
U.S. Appl. No. 17/358,249, filed Jun. 25, 2021, Shubo Li.
U.S. Appl. No. 17/359,487, filed Jun. 25, 2021, Renhui Yang.
U.S. Appl. No. 17/364,602, filed Jun. 30, 2021, Renhui Yang.
U.S. Appl. No. 17/349,764, filed Jun. 16, 2021, Qin Liu.
U.S. Appl. No. 17/359,069, filed Jun. 25, 2021, Yuan Chen.
U.S. Appl. No. 17/359,219, filed Jun. 25, 2021, Yuan Chen.
U.S. Appl. No. 17/359,476, filed Jun. 25, 2021, Wenyu Yang.
Extended European Search Report in European Application No. 21182307.5, dated Dec. 3, 2021, 10 pages.
Kilian, wwwmatthes.in.tum.de [online], "Establishment of a Minimum Viable Self-Sovereign Identity Network," Master's Thesis in Information Systems, Jun. 15, 2020, retrieved on Nov. 25, 2021, retrieved from URL<https://wwwmatthes.in.tum.de/document/downloadFilleVersion?changeSetId=9cjg7wvz0Onwu&type=after>, 99 pages.
Matsuzaki, wordpress.com [online], "Verifiable Credentials: DID Credential Flows Technical Overview," Jun. 25, 2020, retrieved on Nov. 25, 2021, retrieved from URL<https://tsmatz.wordpress.com/2020/06/25/what-is-verifiable-credentials/>, 13 pages.
Shorouq, soton.ac.uk [online], "A Blockchain-based Approach for Secure, Transparent and Accountable Personal Data Sharing," Doctor of Philosophy University of Southampton, Aug. 2, 2020, retrieved on Nov. 25, 2021, retrieved from URL<https://eprints.coton.ac.uk/447633/1/Final_thesis.pdf>, 218 pages.
Wirth et al., "Privacy by BlockChain Design: A BlockChain-enabled GDPR-compliant Approach for Handling Personal Data," AMC Classification Keywords, Jan. 1, 2018, 7 pages.

* cited by examiner

DATA PROCESSING METHODS, APPARATUSES, AND DEVICES

CROSS-REFERENCE TO RELATED APPLICATIONS

This application claims priority to Chinese Patent Application No. 202010922306.8, filed on Sep. 4, 2020, which is hereby incorporated by reference in its entirety.

TECHNICAL FIELD

The present application relates to the field of Internet technologies, and in particular, to data processing methods, apparatuses, and devices.

BACKGROUND

In daily life, users often have needs to present trusted data to other users. Currently, users often need to print needed personal data from authority agents and the data needs to be sealed with official seals of the authorities, so as to ensure the trustworthiness of the data presented to other users.

Therefore, how to provide a method for using trusted data more conveniently becomes an urgent problem to be solved.

SUMMARY

The embodiments of the present specification provide data processing methods, apparatuses, and devices, so as to improve the convenience when users use trusted data.

In order to solve the previously described technical problems, the embodiments of the present description are implemented as follows:

The embodiments of the present specification provide a data processing method, including the following:

An acquisition request for target data of a data owner is obtained; a trusted application (TAPP) for generating the target data is determined based on decentralized identifier document (DID Doc) information of the data owner in response to the acquisition request; a target data generation request is sent to the TAPP, where the target data generation request is used for requesting to use the TAPP to process data of the data owner obtained from a trusted institution so as to generate the target data; and a processing result fed back by the TAPP in response to the target data generation request is received.

The embodiments of the present specification provide a data processing apparatus, including: a first acquisition module, configured to obtain an acquisition request for target data of a data owner; a determining module, configured to determine a TAPP for generating the target data based on DID Doc information of the data owner in response to the acquisition request; a sending module, configured to send a target data generation request to the TAPP, where the target data generation request is used for requesting to use the TAPP to process data of the data owner obtained from a trusted institution so as to generate the target data; and a receiving module, configured to receive a processing result fed back by the TAPP in response to the target data generation request.

The embodiments of the present specification provide a data processing device, including: at least one processor; and a memory communicatively connected to the at least one processor, where the memory stores instructions executable by the at least one processor, and the instructions are executed by the at least one processor so that the at least one processor is able to: obtain an acquisition request for target data of a data owner; determine a TAPP for generating the target data based on DID Doc information of the data owner in response to the acquisition request; send a target data generation request to the TAPP, where the target data generation request is used for requesting to use the TAPP to process data of the data owner obtained from a trusted institution so as to generate the target data; and receive a processing result fed back by the TAPP in response to the target data generation request.

At least one embodiment provided in the present specification can achieve the following beneficial effects:

When an acquisition request for target data of a data owner is obtained, a TAPP for generating the target data is determined based on DID Doc information of the data owner, and data of the data owner obtained from a trusted institution is processed using the TAPP to obtain trusted target data. The solution not only enables a data owner to conveniently provide target data with high trustworthiness to a data user, but also prevents the data user from obtaining original data needed for generating the target data, so that the privacy of the original data of the data owner is protected.

BRIEF DESCRIPTION OF DRAWINGS

In order to more clearly illustrate the embodiments of the present specification or the technical solutions in the existing technology, the accompanying drawings used in the description of the embodiments or the existing technology will be briefly described below. Clearly, the drawings in the following description are only some of the embodiments described in the present application, and for those of ordinary skill in the art, other drawings can be obtained based on these drawings without involving any creative effort.

DESCRIPTION OF EMBODIMENTS

To more clarify the objectives, technical solutions, and advantages of one or more embodiments of the present specification, the technical solutions in one or more embodiments of the present specification will be clearly and comprehensively described below with reference to specific embodiments of the present specification and the corresponding accompanying drawings. Clearly, the described embodiments are only some of the embodiments of the present specification but not all embodiments. All other embodiments obtained by those of ordinary skill in the art based on the embodiments of the present specification without involving creative effort should fall within the scope of protection of one or more embodiments of the present specification.

The technical solutions provided by the embodiments of the present specification are described in detail below with reference to the accompanying drawings.

In the existing technology, users often need to obtain needed data from authorities and the data needs to be sealed with official seals of the authorities, so as to ensure the trustworthiness of the data provided for data users by the users. The data users can process the data provided by the users to obtain trusted data of needed types. In practice, if the users need to use the trusted data for multiple times, the users may also need to go to authority agencies and repeatedly request the data sealed with the official seals from the authorities. The method for using trusted data not only is complicated in operation and brings inconvenience to users, but also causes a data user to obtain a large amount of original data of the users, which easily causes the leakage of the original data of the data owner and affects the privacy and security of the data of the data owner.

Figure 1:
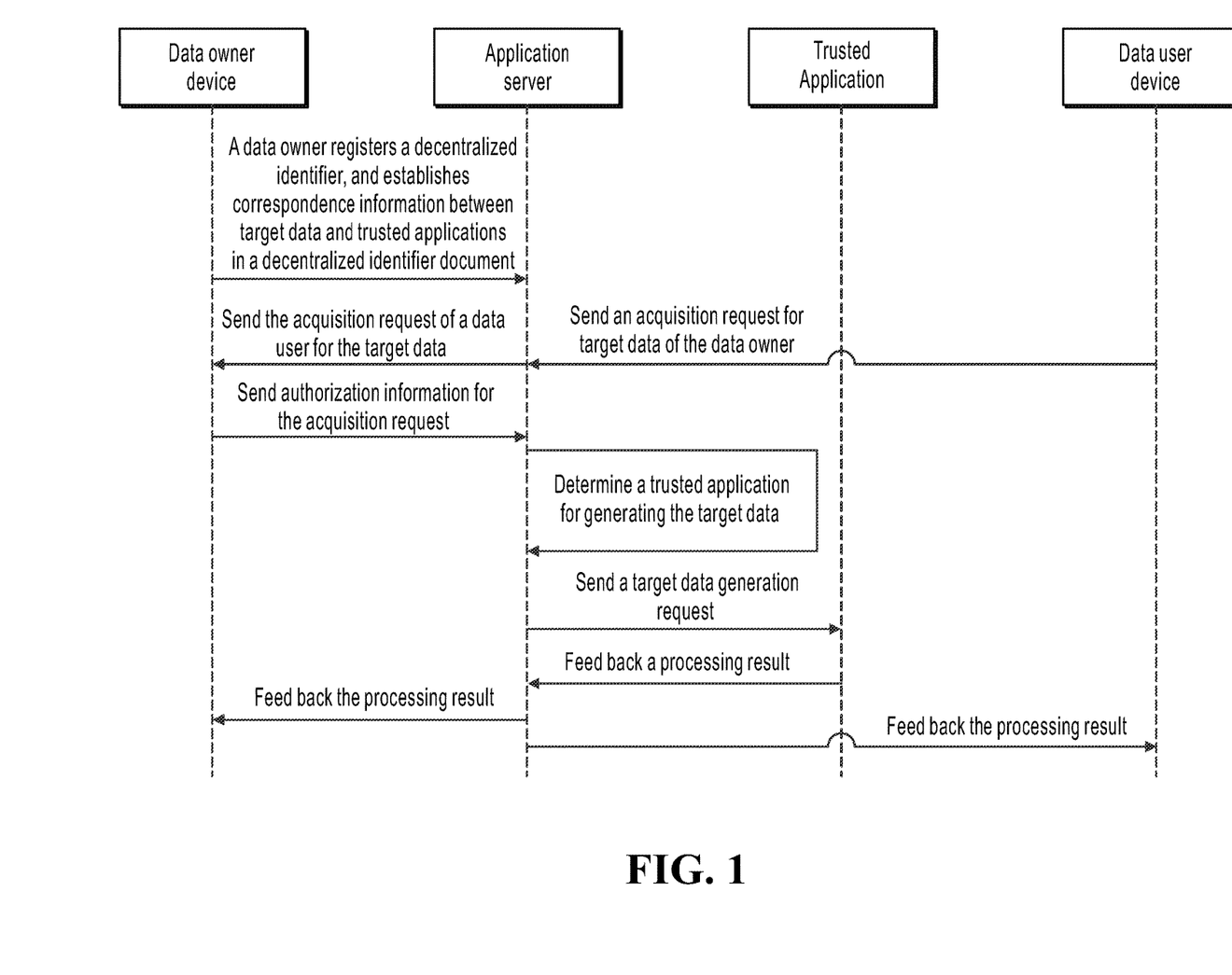
FIG. 1 is a schematic flowchart illustrating an overall solution of a data processing method, according to embodiments of the present specification.

In order to solve the disadvantages in the existing technology, the present solution provides the following embodiments:

FIG. 1 is a schematic flowchart illustrating an overall solution of a data processing method, according to embodiments of the present specification. A data owner can manage trusted data using a target application for managing trusted data (simply referred to as "target application"). Specifically, as shown in FIG. 1, the data owner can register a personal decentralized identifier (DID) based on an application server of the target application, and select a trusted application (TAPP) for generating target data to establish correspondence information between target data and TAPPs in a decentralized identifier document (DID Doc) of the data owner.

When a data user needs to obtain target data of the data owner, the data user can send an acquisition request for the target data to the data owner based on the application server of the target application, and after receiving the acquisition request for the target data from the data user, if the data user is allowed to use the target data, the data owner can generate authorization information for the acquisition request.

When the application server of the target application receives the authorization information fed back by the data owner, a TAPP having a correspondence with the target data can be determined as a TAPP for generating the target data based on information stored in the DID Doc of the data owner.

The application server of the target application can send a target data generation request to the determined TAPP for generating the target data to generate the target data of the data owner using the determined TAPP. The determined TAPP can also feed back a processing result for the target data generation request to the data owner and the data user through the application server of the target application, thereby enabling the data owner and the data user to obtain eventually generated target data based on the processing result.

The solution not only enables a data owner to conveniently provide target data with high trustworthiness to a data user, but also prevents the data user from obtaining original data needed for generating the target data, so that the privacy of the original data of the data owner is protected.

Figure 2:
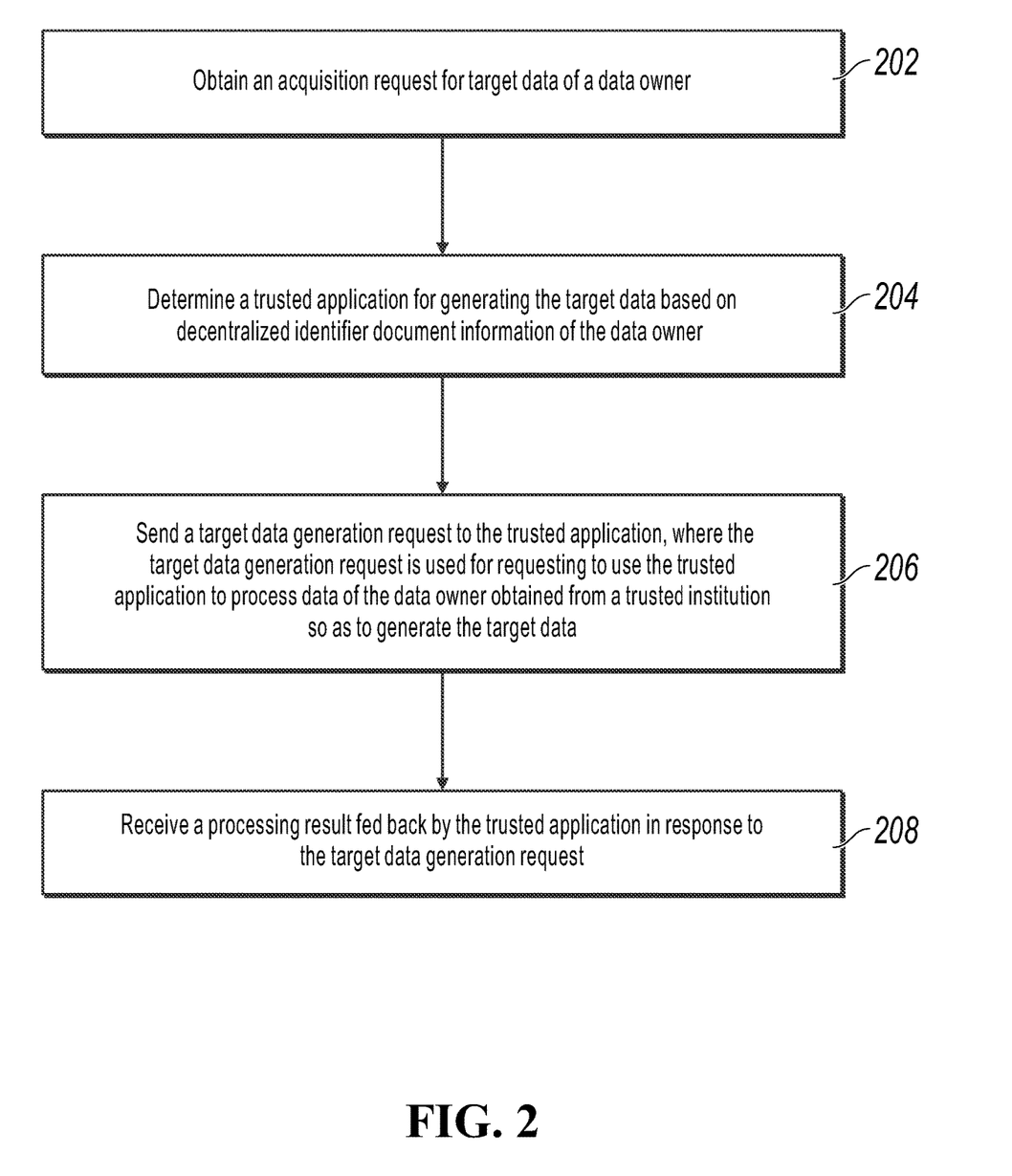
FIG. 2 is a schematic flowchart illustrating a data processing method, according to embodiments of the present specification.

Next, a data processing method provided by the embodiments of the present specification will be described in detail with reference to the accompanying drawings. FIG. 2 is a schematic flowchart illustrating a data processing method, according to embodiments of the present specification. From the perspective of programs, the process can be performed by an application client device or application server for managing trusted data.

As shown in FIG. 2, the process can include the following steps:

S202: Obtain an acquisition request for target data of a data owner.

In the embodiments of the present specification, a data owner can manage trusted data using a target application for managing trusted data (hereinafter simply referred to as "target application"). When the data owner needs to collect target data or when a data user needs to use the target data of the data owner, the target application can obtain the acquisition request for the target data of the data owner.

S204: Determine a TAPP for generating the target data based on DID Doc information of the data owner in response to the acquisition request.

In the embodiments of the present specification, the data owner can register a personal DID in advance using the target application, and select a TAPP for generating target data to establish correspondence information between target data and TAPPs in a DID Doc of the data owner. Therefore, a TAPP having a correspondence with the target data can be determined as a TAPP for generating the target data based on information stored in the DID Doc of the data owner.

In the embodiments of the present specification, a blockchain can be understood as a data chain formed by sequential storage of a plurality of blocks. A block header of each block includes a timestamp of the current block, a hash value of the previous block information, and a hash value of the current block information, thereby realizing mutual verification between blocks and forming a tamper-resistant blockchain. Each block can be understood as a data block (a data storage unit). The blockchain as a decentralized database is a series of data blocks which are generated by mutual correlation using cryptography. Each data block contains information about a network transaction to verify the validity (anti-counterfeiting) of the information and to generate a next block. A chain formed by connecting blocks end to end is a blockchain. If data in the block needs to be modified, the content of all blocks succeeding the block needs to be modified, and data backed up by all nodes in the blockchain network needs to be modified. Therefore, the blockchain has the characteristics of being difficult to tamper and delete, and is reliable as a method for maintaining content integrity after data is already stored in the blockchain.

In the embodiments of the present specification, a decentralized identity service (DIS) can be provided through a blockchain platform, and both the DID and the DID Doc of the data owner can be stored in the blockchain platform. In actual applications, the DID of the data owner can be created by requesting a DIS system through an application server of the target application. The DIS is an identity management solution based on a blockchain, and the DIS system can be connected to the blockchain platform and can provide functions such as digital identity creation, verification, and management, thereby achieving standardized management and protection of entity data, ensuring the authenticity and efficiency of information flow, and solving the problems such as cross-institution identity authentication and data cooperation.

In the embodiments of the present specification, a TAPP can refer to an application running in a trusted execution environment (TEE), and when the TAPP runs, data obtained from a trusted data source can be processed based on a specified computation rule to generate target data. The target data generated by the TAPP has the characteristic of being tamper-resistant because the TAPP runs in the TEE, and the trustworthiness of the target data generated by the TAPP can be ensured because the TAPP is used for processing the data obtained from the trusted data source.

The TEE is a secure extension based on central processing unit (CPU) hardware and is totally isolated from the outside. When the TAPP is mounted in a TEE in a target server, the TEE can be isolated from an operating system of the target server. At present, the industry pays great attention to TEE solutions, almost all mainstream chips and software alliances have their own TEE solutions, such as a trusted platform module (TPM) in software, and Intel software guard extensions (SGX), an ARM Trustzone and an AMD platform security processor (PSP) in hardware. The TEE can function as a hardware black box, and code and data executed in the TEE cannot be snooped even at an operating system layer, and can only be operated through a predetermined interface in the code. For example, data of the data owner can be obtained by the TAPP from a trusted institution through a predetermined interface in code in the TEE. In terms of efficiency, due to the black box property of the TEE, plaintext data is operated in the TEE instead of complex cryptography operation in homomorphic encryption, and the efficiency of calculation process is hardly reduced. Therefore, the data of the data owner is obtained from the trusted institution through a program deployed in the TEE, and the obtained data is processed to generate needed target data. As such, the data privacy needs can be satisfied to a great extent on the premise of relatively small performance loss. Moreover, the trustworthiness of the target data generated based on programs deployed in the TEE can be improved because the programs and data in the TEE are tamper-resistant.

S206: Send a target data generation request to the TAPP, where the target data generation request is used for requesting to use the TAPP to process data of the data owner obtained from a trusted institution so as to generate the target data.

In the embodiments of the present specification, a data source of input data of the TAPP can be predetermined as a trusted institution, and a data processing rule that needs to be executed by the TAPP can be predetermined, so after the TAPP receives a target data generation request, data of the data owner obtained from the trusted institution can be processed to generate the target data. For example, the TAPP can generate the user's quarterly total salary amount based on the user's monthly salary amount data at Bank A, where the quarterly total salary amount can be target data generated by the TAPP. In the embodiments of the present specification, the data source of the TAPP, the data processing rule that needs to be executed, and the type of the generated target data are not specifically limited, and can be set by the user based on actual needs.

In actual applications, the TAPP can be deployed not only on an application client device for managing trusted data, but also on an application server for managing trusted data, or in other servers communicably coupled to the application server for managing trusted data, which is not particularly limited.

There can be a variety of trusted institutions, and the types of data that can be provided by different trusted institutions are generally not identical. For example, the trusted institution can include a bank, a tax bureau, an authority credit reporting institution, and a service platform, where the bank can provide trusted salary data, the tax bureau can provide trusted tax payment records, the authority credit reporting institution can provide trusted credit reports, and the service platform can provide trusted transaction record data of merchants, etc., which is not particularly limited.

S208: Receive a processing result fed back by the TAPP in response to the target data generation request.

In the embodiments of the present specification, the processing result fed back by the TAPP in response to the target data generation request can be received. When the processing result indicates that the target data is already generated, the data owner and the data user can obtain the target data with high trustworthiness from the TAPP. Therefore, the data owner can conveniently obtain trusted data, or the data owner can conveniently provide target data with high trustworthiness to the data user.

It should be understood that the order of some of the steps of the methods described in one or more embodiments of the present specification can be interchanged based on actual needs, or some of the steps can be omitted or deleted.

Through the method in FIG. 2, when an acquisition request for target data of a data owner is obtained, a TAPP for generating the target data is determined based on DID Doc information of the data owner, and data of the data owner obtained from a trusted institution is processed using the TAPP to obtain trusted target data. The solution not only enables a data owner to conveniently provide target data with high trustworthiness to a data user, but also prevents the data user from obtaining original data needed for generating the target data, so that the privacy of the original data of the data owner is protected.

The embodiments of the present specification also provide some specific implementations of the method, which are described below, based on the method in FIG. 2.

In the embodiments of the present specification, before determining a TAPP for generating the target data based on DID Doc information of the data owner in S204, the method can further include the following:

A program identifier of at least one TAPP for generating the target data selected by the data owner is obtained.

A program binding request is generated based on the program identifier, where the program binding request is used for requesting to store correspondence information between the target data and the TAPP in a DID Doc of the data owner.

The obtaining a program identifier of at least one TAPP for generating the target data selected by the data owner can specifically include:

obtaining the program identifier selected by the data owner in the process of registering a DID; or obtaining the program identifier selected by the data owner in the process of publishing the target data.

In the embodiments of the present specification, the data owner can conveniently and rapidly select a TAPP for generating target data in the process of registering a DID using a target application for managing target data. Or, the data owner can also publish data asset description information using the target application for managing trusted data, select a TAPP that can be used to generate target data when publishing the data asset description information, and also update correspondence information between target data and TAPPs in the DID Doc of the data owner. The data owner can conveniently manage personal data assets.

In the embodiments of the present specification, the data asset description information published by the data owner can be used to reflect information such as the source, type, and content overview of data owned by the data owner and a TAPP for generating the data, which is not particularly limited. For example, the data asset description information for the target data of the data owner can be represented as: data source-bank XX; type-quarterly account statement; content overview-data range: Aug. 1, 2019 to Jul. 31, 2020;

TAPP for generating the data-TAPP Y. The data asset description information can reflect that the data owner has trusted data named personal quarterly total salary amount, from Aug. 1, 2019 to Jul. 31, 2020, obtained by processing personal salary data at bank XX using TAPP Y.

In the embodiments of the present specification, a target application for managing trusted data can provide a variety of TAPPs for selection by users. Therefore, the data owner can select one or more TAPPs for generating the target data from a plurality of TAPPs provided by the target application.

Correspondingly, the obtaining the program identifier selected by the data owner in the process of registering a DID can specifically include:

obtaining a TAPP for generating the target data selected by the data owner from TAPPs supported by a target application when the data owner registers the DID using the target application; or obtaining a TAPP for generating the target data selected by the data owner from TAPPs supported by a target application when the data owner publishes the target data using the target application.

In the embodiments of the present specification, the target application used when the data owner registers a DID and the target application for managing the trusted data can be the same application. Details are omitted here for simplicity.

In the embodiments of the present specification, the acquisition request for the target data of the data owner obtained in S202 can be either generated by the data owner or generated by the data user.

When the data user needs to obtain the target data of the data owner, the obtaining an acquisition request for target data of a data owner in S202 can specifically include:

obtaining the acquisition request for the target data of the data owner that is sent by the data user, where the acquisition request is used for requesting to use a specified TAPP to generate the target data.

Correspondingly, the determining a TAPP for generating the target data based on DID Doc information of the data owner specifically includes:

querying whether the DID Doc information of the data owner includes correspondence information between the target data and the specified TAPP; and determining a TAPP for generating the target data as the specified TAPP if the correspondence information is identified.

In the embodiments of the present specification, the data user can also specify a TAPP for generating target data (i.e., specified TAPP). If the data owner has been permitted to use the specified TAPP to generate target data, the DID Doc of the data owner records correspondence information between the specified TAPP and the target data. Therefore, if the correspondence information is identified from the DID Doc of the data owner, a target data generation request can be sent to the specified TAPP, so as to generate target data using the specified TAPP. On the basis of enabling the data owner to provide target data to the data user, specified needs of the data user for a TAPP generating the target data can be satisfied, and the user experience can be improved.

If the correspondence information between the specified TAPP and the target data is not identified from the DID Doc of the data owner, it can indicate that the data owner does not allow the use of the specified TAPP to generate the target data, so that information indicating that the data owner does not allow the use of the specified TAPP to generate the target data can be fed back to the data user. In addition, information about a TAPP for generating target data, the use of which is allowed by the data owner, can be fed back to the data user, so that the data user can conveniently re-initiate an acquisition request for the target data, and the acquisition success rate of the data user for the target data is improved.

In the embodiments of the present specification, to ensure the use security of the target data of the data owner, the data owner can usually be allowed to perform use authorization management and control on the target data of the data owner, and only after the data owner authorizes the data user to obtain the target data of the data owner, the data user can obtain the target data of the data owner.

Therefore, before the target data generation request is sent to the TAPP, the method can further include the following:

A use authorization instruction of a usage right approver of the target data for the acquisition request is obtained. A use authorization verifiable statement is generated based on the use authorization instruction.

Correspondingly, the sending a target data generation request to the TAPP can specifically include: sending a target data generation request including the use authorization verifiable statement to the specified TAPP.

In the embodiments of the present specification, the usage right approver of the target data should include at least the data owner, and in addition, the usage right approver of the target data can include but is not limited to a management party of a target application for managing trusted data, or a management party of a trusted institution that stores data needed to generate the target data. Because the management party of the target application and the management party of the trusted institution may identify some users at risk, the management party of the target application and the management party of the trusted institution can be enabled to identify the risk situation of the data user. If the data user is at a large risk, authorization of the acquisition request of the data user for the target data can be rejected, so that the data user is prevented from obtaining the target data of the data owner, thereby improving the data security of the data owner.

In the embodiments of the present specification, the data owner can manage trusted data based on trusted hardware.

In particular, the data owner can use a target application to request establishment of a binding relationship between trusted hardware and a DID of the data owner. As such, a DID management system (e.g., DIS system) can generate a key pair for the trusted hardware bound to the DID of the data owner, a public key in the key pair can be stored in a DID DOC of the data owner, and a private key in the key pair can be stored in the trusted hardware, so that when the data owner uses the trusted hardware to manage trusted data, the private key is used to prove the identity of the data owner.

Therefore, after the use authorization verifiable statement is generated, the method can further include the following:

A target application digitally signs the use authorization verifiable statement using a private key of the data owner to obtain a signed verifiable statement, where the private key is a private key in a key pair generated, after requesting to establish a correspondence between trusted hardware and a DID of the data owner using the target application, for the correspondence, the private key is stored in the trusted hardware, and a public key in the key pair is stored in a DID Doc of the data owner.

Correspondingly, the sending a target data generation request including the use authorization verifiable statement to the TAPP can specifically include:

sending a target data generation request including the signed verifiable statement to the TAPP.

In the embodiments of the present specification, the target application for generating the signed verifiable statement and the target application for managing the trusted data can be the same application. Details are omitted here for simplicity. In actual applications, the TAPP can obtain a public key corresponding to the trusted hardware from the DID Doc of the data owner, and if signature verification for the signed verifiable statement using the public key is successful, it can indicate that the target data generation request including the signed verifiable statement is truly sent by the data owner, so that the target data can be generated in response to the target data generation request. If the signature verification for the signed verifiable statement using the public key fails, response to the target data generation request can be rejected to protect the security of the target data.

In the embodiments of the present specification, because the information, which is previously specified by the user, about the TAPP for generating target data has been stored in the DID Doc of the data owner, the data owner may not need to specify a TAPP for generating target data when needing to obtain personal target data.

In this case, the obtaining an acquisition request for target data of a data owner in S202 can specifically include:

obtaining the acquisition request for the target data of the data owner that is sent by the data owner.

Correspondingly, the determining a TAPP for generating the target data based on DID Doc information of the data owner can specifically include:

determining TAPPs having a correspondence with the target data based on DID Doc information of the data owner; and determining a TAPP for generating the target data from the TAPPs having a correspondence with the target data.

Or, when the data owner needs to obtain personal target data, a TAPP for generating target data can be specified again.

In this case, the obtaining an acquisition request for target data of a data owner in S202 can specifically include:

obtaining the acquisition request for the target data of the data owner that is sent by the data owner, where the acquisition request is used for requesting to use a specified TAPP to generate the target data.

Correspondingly, the determining a TAPP for generating the target data based on DID Doc information of the data owner can specifically include:

querying whether the DID Doc information of the data owner includes correspondence information between the target data and the specified TAPP; and determining a TAPP for generating the target data as the specified TAPP if the correspondence information is identified.

In actual applications, when the data owner requests to obtain personal target data, after receiving the processing result fed back by the TAPP in response to the target data generation request in S208, the method can further include the following:

The target data is obtained from the TAPP for generating the target data if the processing result indicates that the target data is already generated, and the target data is stored in trusted hardware.

In the embodiments of the present specification, the trusted hardware is one of the important foundations of trusted computation, a TEE can be constructed on a hardware device based on the trusted hardware to protect program code and data in trusted hardware from being disclosed and modified, so that the privacy and security of data in the trusted hardware can be protected. There are many types of trusted hardware, such as SGX of Intel, ARM TrustZone, and other trusted chips. In the embodiments of the present specification, specific models adopted for the trusted hardware are not specifically limited. The trusted hardware can also include an end-user device or server including a trusted chip, etc.

In the embodiments of the present specification, the high trustworthiness of target data extracted from the trusted hardware can be ensured after the target data is stored in the trusted hardware because the target data stored in the trusted hardware is obtained by processing the data obtained from the trusted institution using the TAPP and the data stored in the trusted hardware and the data generated using the TAPP are tamper-resistant. The data owner is enabled to present highly trusted target data to other users through the trusted hardware.

In actual applications, the trusted hardware for storing the target data can be the same as the trusted hardware for storing the private key of the data owner mentioned in the previous embodiments, so that the data owner can not only use the trusted hardware to store the trusted data, but also use the trusted hardware to perform operations such as use authorization management and control on personal trusted data so as to improve user experience. Details are omitted here for simplicity.

Figure 3:
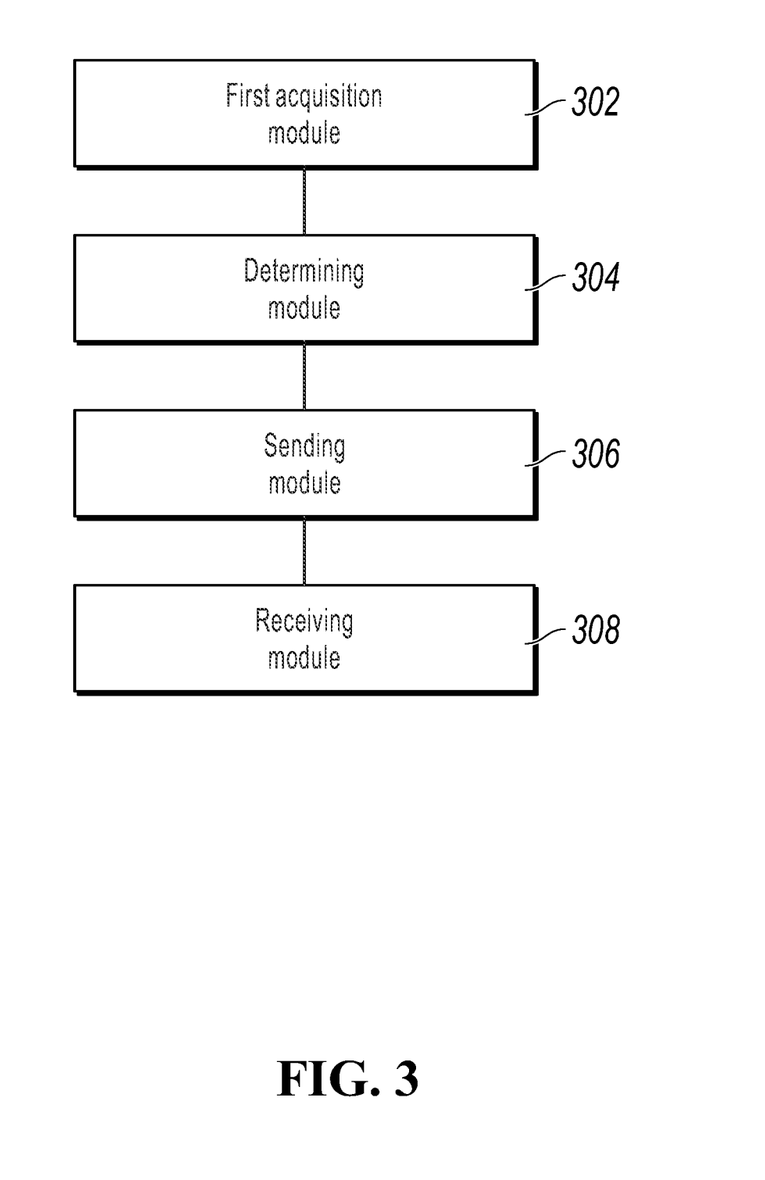
FIG. 3 is a schematic structural diagram illustrating a data processing apparatus corresponding to FIG. 2, according to embodiments of the present specification.

The embodiments of the present specification also provide an apparatus corresponding to the previously described method based on the same idea. FIG. 3 is a schematic structural diagram illustrating a data processing apparatus corresponding to FIG. 2, according to embodiments of the present specification. As shown in FIG. 3, the apparatus can include:

a first acquisition module 302, configured to obtain an acquisition request for target data of a data owner;

a determining module 304, configured to determine a TAPP for generating the target data based on DID Doc information of the data owner in response to the acquisition request;

a sending module 306, configured to send a target data generation request to the TAPP, where the target data generation request is used for requesting to use the TAPP to process data of the data owner obtained from a trusted institution so as to generate the target data, where the TAPP can be mounted in a TEE of a target server, and the TEE is isolated from an operating system of the target server; and data of the data owner is obtained by the TAPP from the trusted institution through a predetermined interface in code in the TEE; and a receiving module 308, configured to receive a processing result fed back by the TAPP in response to the target data generation request.

The embodiments of the present specification also provide some specific implementations of the method, which are described below, based on the apparatus in FIG. 3.

Optionally, the apparatus in FIG. 3 can further include:

a second acquisition module, configured to obtain a program identifier of at least one TAPP for generating the target data selected by the data owner; and a binding request generation module, configured to generate a program binding request based on the program identifier, where the program binding request is used for requesting to store correspondence information between the target data and the TAPP in a DID Doc of the data owner.

Optionally, the second acquisition module can include:

a first acquisition unit, configured to obtain the program identifier selected by the data owner in the process of registering a DID; and a second acquisition unit, configured to obtain the program identifier selected by the data owner in the process of publishing the target data.

Optionally, the first acquisition module 302 can be specifically configured to:

obtain the acquisition request for the target data of the data owner that is sent by a data user, where the acquisition request is used for requesting to use a specified TAPP to generate the target data.

The determining module can be specifically configured to:

query whether the DID Doc information of the data owner includes correspondence information between the target data and the specified TAPP; and determine a TAPP for generating the target data as the specified TAPP if the correspondence information is identified.

Optionally, the apparatus in FIG. 3 can further include:

a third acquisition module, configured to obtain a use authorization instruction of a usage right approver of the target data for the acquisition request; and a verifiable statement generation module, configured to generate a use authorization verifiable statement based on the use authorization instruction.

The sending module can be specifically configured to:

send a target data generation request including the use authorization verifiable statement to the specified TAPP.

Optionally, the apparatus in FIG. 3 can further include:

a digital signature module, configured to digitally sign, by a target application, the use authorization verifiable statement using a private key of the data owner to obtain a signed verifiable statement, where the private key is a private key in a key pair generated, after requesting to establish a correspondence between trusted hardware and a DID of the data owner using the target application, for the correspondence, the private key is stored in the trusted hardware, and a public key in the key pair is stored in a DID Doc of the data owner.

The sending module can be specifically configured to:

send a target data generation request including the signed verifiable statement to the TAPP.

Optionally, the first acquisition module 302 can be specifically configured to:

obtain the acquisition request for the target data of the data owner that is sent by the data owner, where the acquisition request is used for requesting to use a specified TAPP to generate the target data.

The determining module 304 can be specifically configured to:

query whether the DID Doc information of the data owner includes correspondence information between the target data and the specified TAPP; and determine a TAPP for generating the target data as the specified TAPP if the correspondence information is identified.

Optionally, the first acquisition module 302 can be specifically configured to:

obtain the acquisition request for the target data of the data owner that is sent by the data owner.

The determining module is specifically configured to:

determine TAPPs having a correspondence with the target data based on DID Doc information of the data owner; and determine a TAPP for generating the target data from the TAPPs having a correspondence with the target data.

Optionally, the apparatus in FIG. 3 can further include:

a fourth acquisition module, configured to obtain the target data from the TAPP for generating the target data if the processing result indicates that the target data is already generated; and a storage module, configured to store the target data in trusted hardware.

The embodiments of the present specification also provide a device corresponding to the previously described method based on the same idea.

Figure 4:
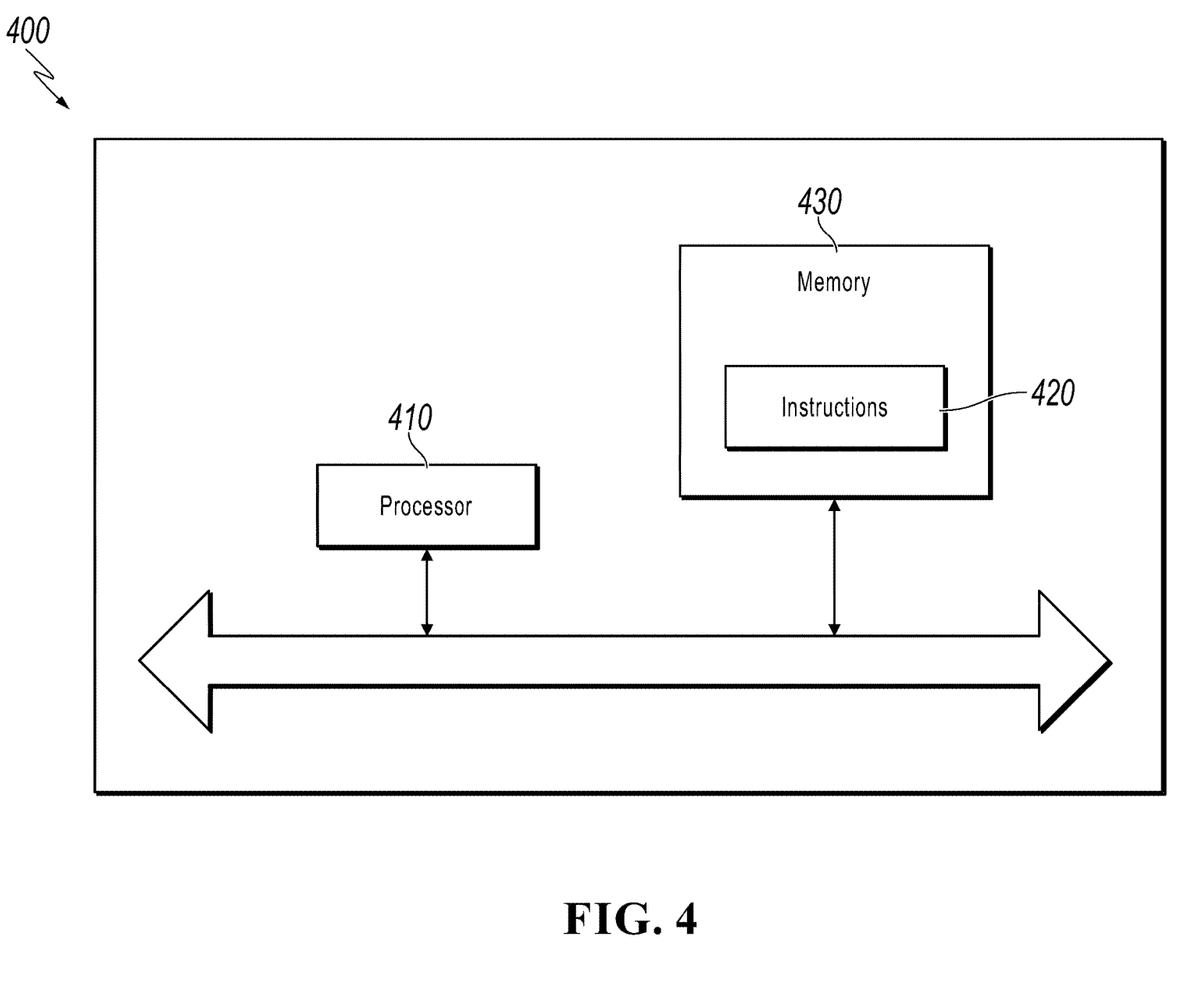
FIG. 4 is a schematic structural diagram illustrating a data processing device corresponding to FIG. 2, according to embodiments of the present specification.

FIG. 4 is a schematic structural diagram illustrating a data processing device corresponding to FIG. 2, according to embodiments of the present specification. As shown in FIG. 4, a device 400 can include:

at least one processor 410; and a memory 430 communicatively coupled to the at least one processor, where the memory 430 stores instructions 420 executable by the at least one processor 410, and the instructions are executed by the at least one processor 410 so that the at least one processor 410 is able to:

obtain an acquisition request for target data of a data owner;

determine a TAPP for generating the target data based on DID Doc information of the data owner in response to the acquisition request;

send a target data generation request to the TAPP, where the target data generation request is used for requesting to use the TAPP to process data of the data owner obtained from a trusted institution so as to generate the target data; and receive a processing result fed back by the TAPP in response to the target data generation request.

The various embodiments in the present specification are described in a progressive method. The same or similar parts between the various embodiments can be referred to each other. The various embodiments place emphasis on differences from other embodiments. In particular, the data processing device shown in FIG. 4 is simply described because it substantially corresponds to the method embodiments. For related parts, references can be made to the descriptions of the method embodiments.

In the 1990s, improvements to a technology could clearly distinguish between improvements in hardware (e.g., improvements to circuit structures such as diodes, transistors, and switches) and improvements in software (improvements to method processes). However, with the development of technologies, many current improvements in method process have been regarded as direct improvements in hardware circuit structure. Designers almost always obtain corresponding hardware circuit structures by programming the improved method process into hardware circuits. Therefore, it is incorrect that an improvement of a method process cannot be implemented with hardware entity modules. For example, a programmable logic device (PLD), such as a field programmable gate array (FPGA), is an integrated circuit with logic functions determined by a user programming the device. It is programmed by a designer to "integrate" a digital system onto a PLD without requiring a chip manufacturer to design and manufacture application specific integrated circuit (ASIC) chips. Moreover, nowadays, instead of manually manufacturing integrated circuit chips, such programming is mostly implemented by using "logic compiler" software, which is similar to a software compiler used at the time of program development and writing, and original code to be compiled must also be written in a specific programming language, which is referred to as a hardware description language (HDL). There are many HDLs rather than one HDL, such as an advanced Boolean expression language (ABEL), an Altera hardware description language (AHDL), Confluence, a Cornell university programming language (CUPL), HDCal, a Java hardware description language (JHDL), Lava, Lola, MyHDL, PALASM, and a Ruby hardware description language (RHDL). A very-high-speed integrated circuit hardware description language (VHDL) and Verilog are most commonly used at present. It will also be clear to those skilled in the art that a hardware circuit implementing the logic method process can be readily obtained by only slightly logically programming and programming the method process into an integrated circuit by using the previous several hardware description languages.

A controller can be implemented in any suitable manner. For example, the controller can take the form of, for example, a micro-processor or processor and a computer readable medium storing computer readable program code (e.g., software or firmware) executable by the (micro) processor, logic gates, switches, ASICs, programmable logic controllers, and embedded micro controllers. Examples of the controller include, but are not limited to, the following micro controllers: ARC 625D, Atmel AT91SAM, Microchip PIC18F26K20, and Silicone Labs C8051F320. The memory controller can also be implemented as a part of the control logic of the memory. Those skilled in the art will also know that, in addition to implementing the controller in pure computer readable program code, it is entirely possible to logically program the method steps so that the controller implements the same function in the form of logic gates, switches, ASICs, programmable logic controllers, embedded micro controllers, etc. Such a controller can thus be regarded as a hardware component, and an apparatus that is included in the hardware component and configured to implement various functions can also be regarded as a structure within the hardware component. Or even, the apparatus for implementing various functions can be regarded as a software module implementing the method and a structure within the hardware component.

The system, apparatus, module, or unit illustrated in the previous embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an email receiving and transmitting device, a game console, a tablet, a wearable device, or any combination of these devices.

For convenience of description, the previous apparatuses are described, respectively, as being functionally divided into various units. Certainly, the functions of the various units can be implemented in the same or multiple pieces of software and/or hardware when implementing the present application.

A person skilled in the art should understand that the embodiments of the present disclosure can be provided as methods, systems or computer program products. Therefore, the present disclosure may take the form of an entirely hardware embodiment, an entirely software embodiment or an embodiment combining software and hardware. Moreover, the present disclosure can take the form of a computer program product implemented on one or more computer available storage media (including, but not limited to, a disk memory, a CD-ROM, an optical memory, etc.) containing computer available program code.

The present disclosure is described with reference to flowcharts and/or block diagrams of the method, the device (system), and the computer program product according to the embodiments of the present disclosure. It should be understood that each flow and/or block in the flowcharts and/or block diagrams and combinations of flows and/or blocks in the flowcharts and/or block diagrams can be implemented by computer program instructions. These computer program instructions can be provided to a general-purpose computer, a specific-purpose computer, an embedded processor, or a processor of other programmable data processing devices to generate a machine, so that instructions executed by the computer or the processor of the other programmable data processing devices produce an apparatus for implementing functions specified in one or more flows in the flowcharts and/or one or more blocks in the block diagrams.

These computer program instructions can also be stored in a computer readable memory capable of guiding a computer or other programmable data processing devices to work in a specific way, so that instructions stored in the computer readable memory produce a product including an instruction apparatus that implements functions specified in one or more flows in the flowcharts and/or one or more blocks in the block diagrams.

These computer program instructions can also be loaded to a computer or other programmable data processing devices, so that a series of operating steps are performed on the computer or the other programmable data processing devices to produce a computer-implemented process, and therefore instructions executed on the computer or the other programmable data processing devices provide steps for implementing functions specified in one or more flows in the flowcharts and/or one or more blocks in the block diagrams.

In a typical configuration, the computer includes one or more CPUs, an input/output interface, a network interface, and a memory.

The memory may include a non-persistent memory, a random access memory (RAM), and/or a non-volatile memory in a computer readable medium, such as a read-only memory (ROM) or a flash RAM. The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD), or another optical storage, a cassette, a magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is also worthwhile to note that the terms "include", "contain" or any other their variations are intended to cover a non-exclusive inclusion, so that a process, method, product, or device including a series of elements includes not only those elements but also other elements not explicitly listed, or elements that are inherent to such process, method, product, or device. Without more restrictions, elements described by the phrase "include a/an . . ." do not exclude the existence of additional identical elements in the process, method, product, or device that includes the elements.

A person skilled in the art should understand that the embodiments of the present application can be provided as methods systems or computer program products. Therefore, the present application can take the form of an entirely hardware embodiment, an entirely software embodiment or an embodiment combining software and hardware. Moreover, the present application can take the form of a computer program product implemented on one or more computer available storage media (including but not limited to a disk memory, a CD-ROM, an optical memory, etc.) containing computer available program code.

The present application can be described in the general context of computer executable instructions, such as program modules, executed by a computer. Generally, the program modules include routines, programs, objects, components, data structures, etc. that perform particular tasks or implement particular abstract data types. The present application can also be practiced in distributed computing environments where tasks are performed by remote processing devices that are connected through a communications network. In the distributed computing environments, the program modules can be located in both local and remote computer storage media including storage devices.

The previous descriptions are merely embodiments of the present application, and are not intended to limit the present application. For those skilled in the art, there can be various changes and variations of the present application. Any modifications, equivalent substitutions, improvements, etc. that come within the spirit and principles of the present application are intended to be included within the scope of the claims of the present application.

What is claimed is:

1. A computer-implemented method, comprising:
    obtaining, by one or more processors and from a data user account, an acquisition request for accessing target data of a data owner;
    determining, by the one or more processors, a trusted application (TAPP) for generating the target data based on correspondence information comprised in a decentralized identifier document (DID Doc) information of the data owner in response to the acquisition request, wherein the correspondence information describes a correspondence between the target data and the TAPP;
    sending, by the one or more processors and to the TAPP, a target data generation request, wherein the target data generation request requests the TAPP to generate the target data based on processing data of the data owner using a data processing rule configured to hide private portions of the data of the data owner, the data of the data owner comprising the target data of the data owner, wherein the data of the data owner is obtained from a trusted institution, and wherein the private portions of the data of the data owner are unavailable to the data user account; and
    receiving, by the one or more processors and from the TAPP, a processing result comprising the target data, wherein the processing result is obtained from processing the data of the data owner.

2. The computer-implemented method according to claim 1, comprising:
    before determining the TAPP for generating the target data, obtaining a program identifier of at least one TAPP; and
    generating, based on the program identifier of at least one TAPP, a program binding request for requesting to store correspondence information between the target data and the TAPP in the DID Doc of the data owner.

3. The computer-implemented method according to claim 2, wherein obtaining the program identifier of at least one TAPP comprises:
    obtaining a program identifier selected by the data owner while registering a DID or publishing the target data.

4. The computer-implemented method according to claim 3, wherein obtaining the program identifier selected by the data owner comprises:
    obtaining the TAPP for generating the target data selected by the data owner from TAPPs supported by a target application when the DID is registered or published by the data owner using the target application.

5. The computer-implemented method according to claim 1, wherein obtaining the acquisition request for the target data of the data owner comprises:
    obtaining, from the data user account, the acquisition request, wherein the acquisition request requests to use a specified TAPP to generate the target data; and wherein
    determining the TAPP for generating the target data comprises:
        determining that the DID Doc of the data owner comprises correspondence information between the target data and the specified TAPP; and
        determining the TAPP for generating the target data as the specified TAPP.

6. The computer-implemented method according to claim 5, wherein the method further comprises:
    before sending, to the TAPP, the target data generation request, obtaining a use authorization instruction of a usage right approver of the target data for the acquisition request; and
    generating a use authorization verifiable statement based on the use authorization instruction, wherein the target data generation request comprises the use authorization verifiable statement.

7. The computer-implemented method according to claim 6, wherein the method comprises:
    after generating the use authorization verifiable statement, digitally signing, by a target application, the use authorization verifiable statement using a private key of the data owner to obtain a signed verifiable statement, wherein the private key is in a key pair generated after requesting to establish a correspondence between trusted hardware and a DID of the data owner using the target application, wherein the private key is stored in the trusted hardware, wherein a public key in the key pair is stored in the DID Doc of the data owner, and wherein the target data generation request comprises the signed verifiable statement.

8. The computer-implemented method according to claim 1, wherein obtaining the acquisition request for the target data of the data owner comprises:
    obtaining, from the data owner, the acquisition request for the target data of the data owner; and wherein determining the TAPP for generating the target data comprises:

determining TAPPs corresponding to the target data based on the DID Doc of the data owner; and
determining the TAPP for generating the target data from the TAPPs.

9. The computer-implemented method according to claim 8, wherein the method comprises:
determining, based on the processing result, that the target data is al ready generated;
obtaining the target data from the TAPP that generates the target data; and
storing the target data in trusted hardware.

10. The computer-implemented method according to claim 1, wherein the TAPP is installed in a trusted execution environment (TEE) of a server, and the TEE is isolated from an operating system of the server.

11. The computer-implemented method according to claim 10, wherein the data of the data owner is obtained by the TAPP from the trusted institution through a predetermined interface of the TEE.

12. A non-transitory, computer-readable medium storing one or more instructions executable by a computer system to perform operations comprising:
obtaining, from a data user account, an acquisition request for accessing target data of a data owner;
determining a trusted application (TAPP) for generating the target data based on correspondence information comprised in a decentralized identifier document (DID Doc) information of the data owner in response to the acquisition request, wherein the correspondence information describes a correspondence between the target data and the TAPP;
sending, to the TAPP, a target data generation request, wherein the target data generation request requests the TAPP to generate the target data based on processing data of the data owner using a data processing rule configured to hide private portions of the data of the data owner, the data of the data owner comprising the target data of the data owner, wherein the data of the data owner is obtained from a trusted institution, and wherein the private portions of the data of the data owner are unavailable to the data user account; and
receiving, from the TAPP, a processing result comprising the target data, wherein the processing result is obtained from processing the data of the data owner.

13. The non-transitory, computer-readable medium according to claim 12, comprising:
before determining the TAPP for generating the target data, obtaining a program identifier of at least one TAPP; and
generating, based on the program identifier of at least one TAPP, a program binding request for requesting to store correspondence information between the target data and the TAPP in the DID Doc of the data owner.

14. The non-transitory, computer-readable medium according to claim 13, wherein obtaining the program identifier of at least one TAPP comprises:
obtaining a program identifier selected by the data owner while registering a DID or publishing the target data.

15. The non-transitory, computer-readable medium according to claim 14, wherein obtaining the program identifier selected by the data owner comprises:
obtaining the TAPP for generating the target data selected by the data owner from TAPPs supported by a target application when the DID is registered or published by the data owner using the target application.

16. The non-transitory, computer-readable medium according to claim 12, wherein obtaining the acquisition request for the target data of the data owner comprises:
obtaining, from the data user account, the acquisition request, wherein the acquisition request requests to use a specified TAPP to generate the target data; and
wherein determining the TAPP for generating the target data comprises:
determining that the DID Doc of the data owner comprises correspondence information between the target data and the specified TAPP; and
determining the TAPP for generating the target data as the specified TAPP.

17. The non-transitory, computer-readable medium according to claim 16, wherein the operations comprise:
before sending, to the TAPP, the target data generation request, obtaining a use authorization instruction of a usage right approver of the target data for the acquisition request; and
generating a use authorization verifiable statement based on the use authorization instruction, wherein the target data generation request comprises the use authorization verifiable statement.

18. The non-transitory, computer-readable medium according to claim 17, wherein the operations comprise:
after generating the use authorization verifiable statement, digitally signing, by a target application, the use authorization verifiable statement using a private key of the data owner to obtain a signed verifiable statement, wherein the private key is in a key pair generated after requesting to establish a correspondence between trusted hardware and a DID of the data owner using the target application, wherein the private key is stored in the trusted hardware, wherein a public key in the key pair is stored in the DID Doc of the data owner, and wherein the target data generation request comprises the signed verifiable statement.

19. The non-transitory, computer-readable medium according to claim 12, wherein obtaining the acquisition request for the target data of the data owner comprises:
obtaining, from the data owner, the acquisition request for the target data of the data owner; and wherein determining the TAPP for generating the target data comprises:
determining TAPPs corresponding to the target data based on the DID Doc of the data owner; and
determining the TAPP for generating the target data from the TAPPs.

20. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, from a data user account, an acquisition request for accessing target data of a data owner;
determining a trusted application (TAPP) for generating the target data based on correspondence information comprised in a decentralized identifier document (DID Doc) information of the data owner in response to the acquisition request, wherein the correspondence information describes a correspondence between the target data and the TAPP;
sending, to the TAPP, a target data generation request, wherein the target data generation request requests the TAPP to generate the target data based on processing data of the data owner using a data processing rule configured to hide private portions of the data of the data owner, the data of the data owner comprising the target data of the data owner, wherein the data of the data owner is obtained from a trusted institution, and wherein the private portions of the data of the data owner are unavailable to the data user account; and receiving, from the TAPP, a processing result comprising the target data, wherein the processing result is obtained from processing the data of the data owner.

* * * * *

UNITED STATES PATENT AND TRADEMARK OFFICE
CERTIFICATE OF CORRECTION

PATENT NO. : 11,455,417 B2
APPLICATION NO. : 17/348975
DATED : September 27, 2022
INVENTOR(S) : Renhui Yang et al.

It is certified that error appears in the above-identified patent and that said Letters Patent is hereby corrected as shown below:

In the Claims

Column 17, Line 8, Claim 9, delete "al ready" and insert -- already --.

Signed and Sealed this
Twenty-seventh Day of December, 2022

Katherine Kelly Vidal
*Director of the United States Patent and Trademark Office*